US012697760B2

(12) United States Patent
Kurokawa et al.

(10) Patent No.: US 12,697,760 B2
(45) Date of Patent: Aug. 4, 2026

(54) MOLD, METHOD FOR MANUFACTURING PLATE-SHAPED MOLDED ARTICLE, METHOD FOR MANUFACTURING TEST PIECE, AND METHOD FOR PREDICTING CHARACTERISTICS OF RESIN COMPOSITION MOLDED ARTICLE

(71) Applicant: DIC Corporation, Tokyo (JP)

(72) Inventors: Ryuhei Kurokawa, Chihara (JP); Kazuhiro Ichikawa, Ichihara (JP)

(73) Assignee: DIC Corporation, Tokyo (JP)

( * ) Notice: Subject to any disclaimer, the term of this patent is extended or adjusted under 35 U.S.C. 154(b) by 111 days.

(21) Appl. No.: 18/034,194

(22) PCT Filed: Oct. 14, 2021

(86) PCT No.: PCT/JP2021/037985
§ 371 (c)(1),
(2) Date: Apr. 27, 2023

(87) PCT Pub. No.: WO2022/123899
PCT Pub. Date: Jun. 16, 2022

(65) Prior Publication Data
US 2023/0398723 A1      Dec. 14, 2023

(30) Foreign Application Priority Data

Dec. 9, 2020      (JP) ................................. 2020-204539

(51) Int. Cl.
 *B29C 45/27*          (2006.01)
 *B29C 45/76*          (2006.01)
(52) U.S. Cl.
 CPC ...... *B29C 45/2708* (2013.01); *B29C 45/2725* (2013.01); *B29C 45/76* (2013.01);
(Continued)

(58) Field of Classification Search
 CPC . B29C 45/1759; B29C 45/27; B29C 45/2708; B29C 45/2725; B29C 45/2756;
(Continued)

(56) References Cited

U.S. PATENT DOCUMENTS 4,097,928 A      6/1978  Fries
6,893,599 B2 *   5/2005  Howell et al. ...... B29C 33/0072
                                                      264/328.6
(Continued)

FOREIGN PATENT DOCUMENTS

CN          107356478 A      11/2017
DE      102013205141 A1       9/2014
(Continued)

*Primary Examiner* — Xiao S Zhao
*Assistant Examiner* — Joseph S Leyson
(74) *Attorney, Agent, or Firm* — Troutman Pepper Locke LLP; James E. Armstrong, IV; Gabrielle L. Gelozin

(57)          ABSTRACT

A mold, a method for producing a plate-shaped molded article, and a method for producing a test piece capable of easily producing a test piece in which an orientation direction of a filler is highly aligned are provided. A method for predicting a characteristic of a resin composition molded article is also provided, the method being able to measure an anisotropy characteristic value of a resin composition by using the test piece and to improve prediction accuracy by using the characteristic value in a computer analysis. Further in detail, a mold for injection molding the plate-shaped molded article by using a molten material of a thermoplastic resin includes a runner section that has a slit gate section provided along a width direction of the plate-shaped molded article and is configured to fill a cavity with the molten material, which is injected via a sprue section, via the slit gate section.

13 Claims, 6 Drawing Sheets

FLOW DIRECTION

(52) U.S. Cl.
    CPC .................. *B29C 2045/2714* (2013.01); *B29C*
        *2793/0009* (2013.01); *B29C 2793/009*
        (2013.01)
(58) Field of Classification Search
    CPC ............ B29C 45/76; B29C 2045/2706; B29C
        2045/2714; B29C 2045/273; B29C
        2045/2795
    See application file for complete search history.

(56) References Cited

U.S. PATENT DOCUMENTS

| | | |
|---|---|---|
| 2009/0243154 A1 | 10/2009 | Suzuki et al. |
| 2022/0010073 A1 | 1/2022 | Tokuzumi et al. |

FOREIGN PATENT DOCUMENTS

| | | |
|---|---|---|
| JP | H07-40391 A | 2/1995 |
| JP | H08-252838 A | 10/1996 |
| JP | 2009-226841 A | 10/2009 |
| JP | 2020-015260 A | 1/2020 |
| JP | 2020153918 A | 9/2020 |
| WO | 2020/196273 A1 | 10/2020 |

* cited by examiner

FLOW DIRECTION (90°)          (45°)          (0°)

FLOW DIRECTION

GLASS FIBER          GLASS FIBER

Fig. 8                    GLASS FIBER DETACHED HOLE

GLASS FIBER                              GLASS FIBER

MOLD, METHOD FOR MANUFACTURING PLATE-SHAPED MOLDED ARTICLE, METHOD FOR MANUFACTURING TEST PIECE, AND METHOD FOR PREDICTING CHARACTERISTICS OF RESIN COMPOSITION MOLDED ARTICLE

TECHNICAL FIELD

The present disclosure relates to a mold, a method for producing a plate-shaped molded article, a method for producing a test piece, and a method for predicting characteristics of a resin composition molded article.

BACKGROUND ART

In recent years, resin materials represented by engineering plastics have widely been used for electric, electronic, and transportation device components, construction materials, and the like, taking advantages of excellent productivity and moldability, light weight, and high heat resistance.

Fillers are often added to such resin materials to provide necessary characteristics. The following description will be based on an example of strength as a characteristic. However, the characteristic is not limited to the strength but refers to properties in general, such as another mechanical property, electrical conductivity, and thermal conductivity, that can be added or enhanced by the fillers. Most commonly, a rod-shaped fine reinforcement is added to increase the strength. Typical examples thereof are glass fiber and carbon fiber. It is generally known that the resin material containing such a reinforcement changes a characteristic value when a direction to measure the characteristic differs from an alignment direction (an orientation direction) of the reinforcement, and such a change is referred to as "anisotropy" of the strength. For example, tensile strength becomes the greatest in a direction in which the reinforcement is fully oriented, and becomes the lowest in a right or perpendicular direction.

In product design, a computer analysis is used to predict the strength and durability of a product. A single characteristic (a physical property) value of the material used in such a calculation is determined for a uniform material such as metal. However, in the product that is made from the resin material containing the reinforcement, the orientation direction of the internal reinforcement is not uniform, and thus the characteristic varies by place. In such a case, an influence of the anisotropy is taken into consideration for the analysis by calculating the orientation direction of the reinforcement and calculating the various characteristics according to the direction.

For this purpose, it is important to have data on a relationship between the orientation direction and each of the various characteristics. However, since a general shape of a test piece for measurement is a rectangular shape that is long in one direction and represented by a dumbbell, it is almost impossible to freely change the orientation direction. Thus, a flat plate is made with the reinforcement being oriented in one direction, the test piece is cut out at a different angle to the orientation direction, and the characteristic of the test piece is then measured.

However, in reality, it is extremely difficult to orient the reinforcement in one direction in the injection-molded flat plate, and thus useful data cannot be obtained. This is because the resin in the mold also flows in a lateral direction, and Autodesk Inc., a developer of flow analysis software, has also pointed this out. (Reference: AUTODESK Inc.

corporate document, AUTODESK UNIVERSITY 2013, Fiber Orientation and Length Modeling: Concepts Behind the Calculations, https://download.autodesk.com/temp/pdf/simday2013_002.pdf)

In connection with the above, a mold used in a resin forming method that improves orientation of the filler by using an interfering member is disclosed in PTL 1.

CITATION LIST

Patent Literature

PTL 1: JP2009-226841A

SUMMARY OF INVENTION

Technical Problem

However, the method in PTL 1 requires the extra interfering member, and a required length for the test piece may not be secured with a material with poor flowability.

The present disclosure has been made in view of the above circumstance, and therefore has a purpose of providing a mold, a method for producing a plate-shaped molded article, and a method for producing a test piece capable of easily producing a test piece in which an orientation direction of a filler is highly aligned. The present disclosure also has another purpose of providing a method for predicting characteristics of a resin composition molded article, the method being able to measure an anisotropy characteristic value of a resin composition by using the test piece and to improve prediction accuracy by using the characteristic value in a computer analysis.

Solution to Problem

A mold according to one embodiment of the present disclosure is a mold for injection molding a plate-shaped molded article by using a molten material of a thermoplastic resin, and includes a runner section that has a slit gate section provided along a width direction of the plate-shaped molded article and is configured to fill a cavity with the molten material via the slit gate section, the molten material being injected via a sprue section, in which the runner section divides the molten material from the sprue section, merges the divided molten materials in a portion along the slit gate section, and guides the merged molten material to the slit gate section.

A method for producing a plate-shaped molded article according to one embodiment of the present disclosure includes a step of using the above mold to fill the cavity with the merged molten material via the slit gate section.

A method for producing a test piece according to one embodiment of the present disclosure includes a step of cutting out a test piece from a plate-shaped molded article, which is produced by the above method for producing a plate-shaped molded article, along at least one angle within a range of 0° to 90° with respect to a flow direction.

A method for predicting a characteristic of a resin composition molded article according to one embodiment of the present disclosure includes a step of measuring a characteristic of a test piece that is produced by the above method for producing a test piece.

In addition, the method for predicting a characteristic of a resin composition molded article according to the embodiment of the present disclosure includes a step of calculating a characteristic of a resin composition molded article that differs from the test piece on the basis of the measured characteristic of the test piece.

Advantageous Effects of Invention

According to the present disclosure, it is possible to provide the mold, the method for producing a plate-shaped molded article, and the method for producing a test piece capable of easily producing the test piece in which an orientation direction of a filler is highly aligned. In addition, according to the present disclosure, it is possible to provide the method for predicting characteristics of a resin composition molded article, the method being able to measure an anisotropy characteristic value of the resin composition by using the test piece and to improve prediction accuracy by using the characteristic value in a computer analysis.

BRIEF DESCRIPTION OF DRAWINGS

FIG. 8 is a micrograph of the fracture surface of the test piece obtained in Comparative Example 4.

DESCRIPTION OF EMBODIMENTS (Mold)

Figure 1:
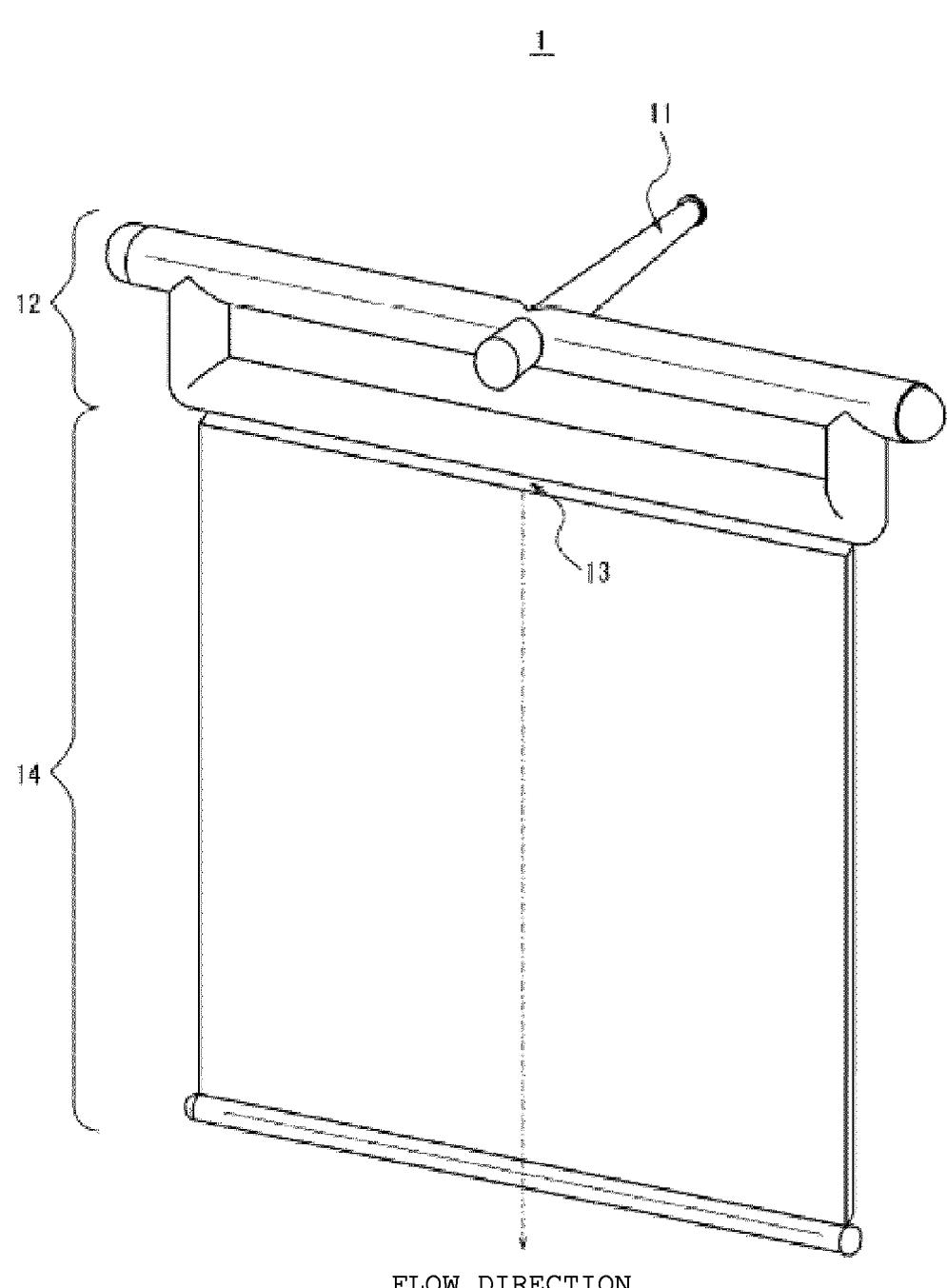
FIG. 1 is a perspective view of a mold according to an embodiment of the present disclosure.

Hereinafter, a description will be made on a mold 1 according to an embodiment of the present disclosure with reference to the drawings. In the drawings, which will be used in the following description, shapes and dimensional relationships of illustrated elements may differ from the shapes and the dimensional relationships in the actual mold 1.

Figure 2:
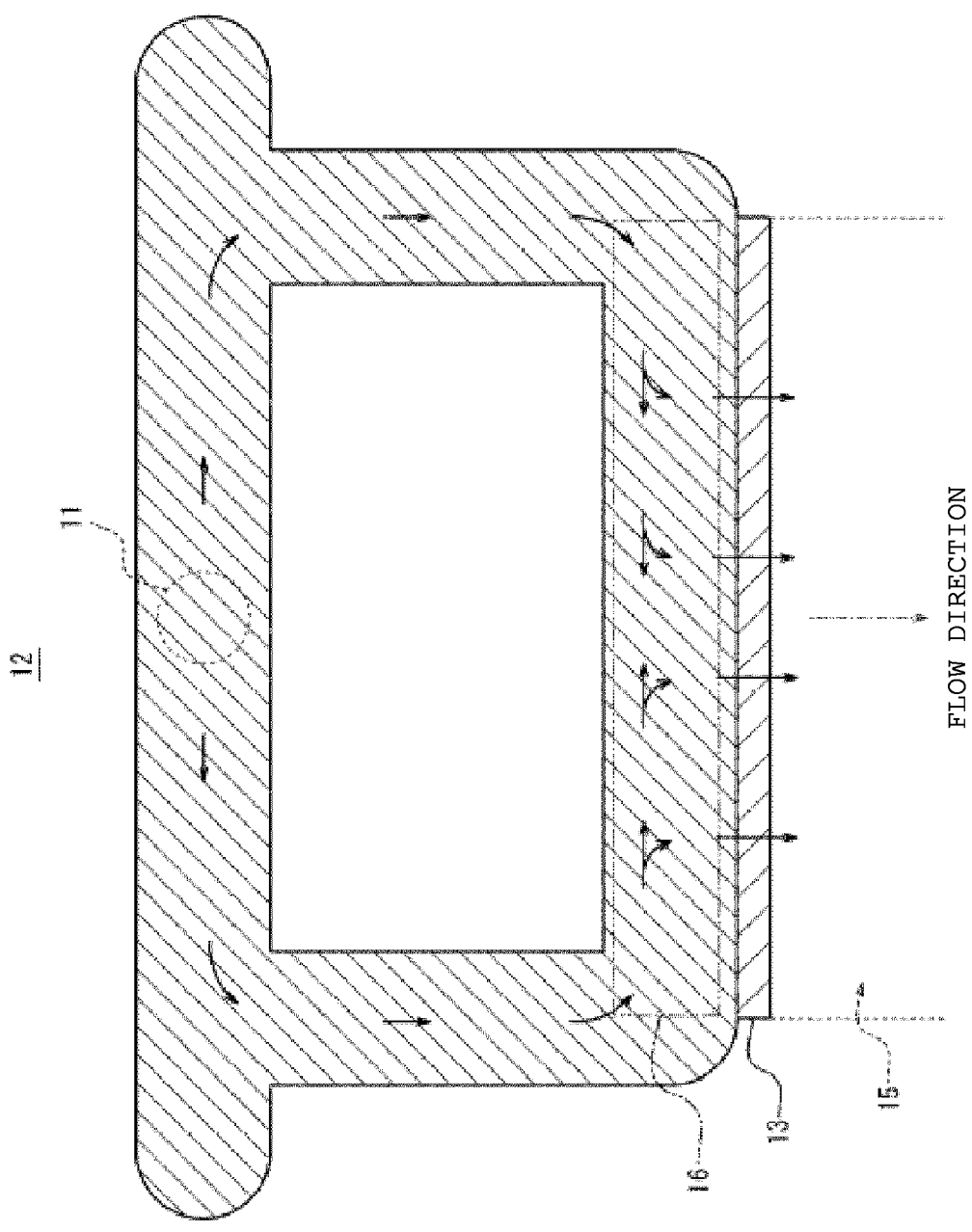
FIG. 2 is a cross-sectional view of a runner section of the mold in FIG. 1.

FIG. 1 is an external perspective view of the mold 1 according to this embodiment. FIG. 2 is a cross-sectional view of a runner section 12 of the mold 1 illustrated in FIG. 1. The mold 1 is used to injection-mold a plate-shaped molded article 20 (see FIG. 3) by using a molten material of a resin composition containing a thermoplastic resin and an anisotropic filler. An example of the resin composition is a polyarylene sulfide (PAS) resin composition. The PAS resin composition is a composition containing a PAS resin and a fibrous filler.

The mold 1 includes: a sprue section 11 into which the molten material of the resin composition (hereinafter simply referred to as the "molten material") is first injected; the runner section 12 having a slit gate section 13; and a molding section 14 having a cavity 15 therein to mold the plate-shaped molded article 20. The sprue section 11 and the runner section 12 are channels through which the molten material of the resin composition flows. In the present disclosure, as illustrated in FIG. 1, a flow direction (MD: Machine Direction) is defined as a direction in which the resin flows in the molding section 14. The flow direction is a direction that is orthogonal to a longitudinal direction of the slit gate section 13. Here, the cavity 15 is a cavity portion that is filled with the molten material.

In this embodiment, the sprue section 11 has a hollow pipe shape having a circular cross section. However, the sprue section 11 is not limited to such a shape. A part of the hollow portion of the sprue section 11 is connected to a hollow portion of the runner section 12, and the molten material that has flowed through the sprue section 11 is injected into the runner section 12. In this embodiment, the sprue section 11 intersects the runner section 12 at a right angle when seen in the flow direction. However, the connection between the sprue section 11 and the runner section 12 is not limited thereto.

As illustrated in FIG. 2, the runner section 12 has the slit gate section 13 that is provided along a width direction of the plate-shaped molded article 20 to be formed. Here, the width direction of the plate-shaped molded article 20 is parallel to a perpendicular direction (TD: a transverse direction) to the flow direction. The runner section 12 is configured to fill the cavity 15 with the molten material, which is injected via the sprue section 11, via the slit gate section 13.

The runner section 12 divides the molten material from the sprue section 11, and merges the divided molten materials in a portion along the slit gate section 13 (a merging area 16), and guides the merged molten material to the slit gate section 13. As illustrated in FIG. 2, in the runner section 12, the molten material from the sprue section 11 is first divided into two directions. In the merging area 16, the divided molten materials are merged from both sides in the perpendicular direction to the flow direction toward a center. The merged molten material is pushed out toward the slit gate section 13 and is injected into the cavity 15 through the slit in the slit gate section 13.

Since the runner section 12 has the configuration to divide the molten material and merge the divided molten materials in the merging area 16 along the slit gate section 13, a flow of a TD component of the molten material, which is guided to the slit gate section 13, is offset or is at least attenuated. That is, the molten material filling the cavity 15 flows through the slit gate section 13 while maintaining an MD component of the flow and attenuating the TD component thereof. Accordingly, in regard to the molten material filling the cavity 15, an orientation direction of the filler follows the flow direction. In particular, in a central portion of the slit gate section 13, the TD components of the molten materials that have flowed from both end sides of the slit gate section 13 in a similar manner are offset. Thus, in a central portion in the width direction of the plate-shaped molded article 20, particularly, the orientation direction of the filler follows flow direction.

Here, the mold in the related art guides the molten material to the gate without dividing the molten material. Representative structures are illustrated in FIG. 4 and FIG. 5.

Figure 4:
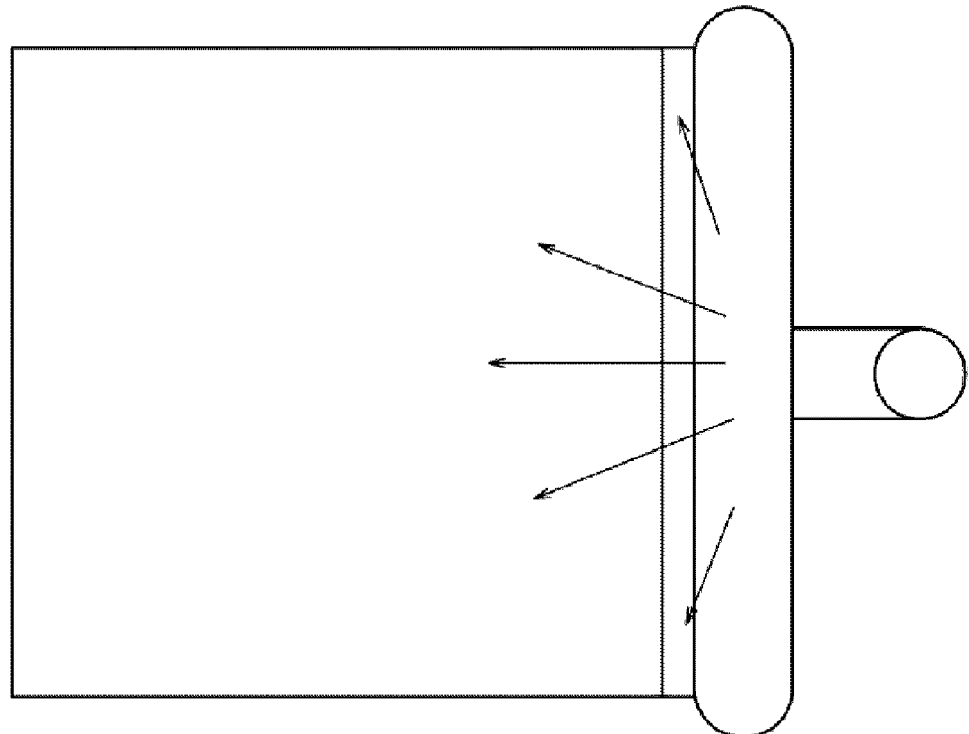
FIG. 4 is a view illustrating a resin flow in a conventional mold.
Figure 5:
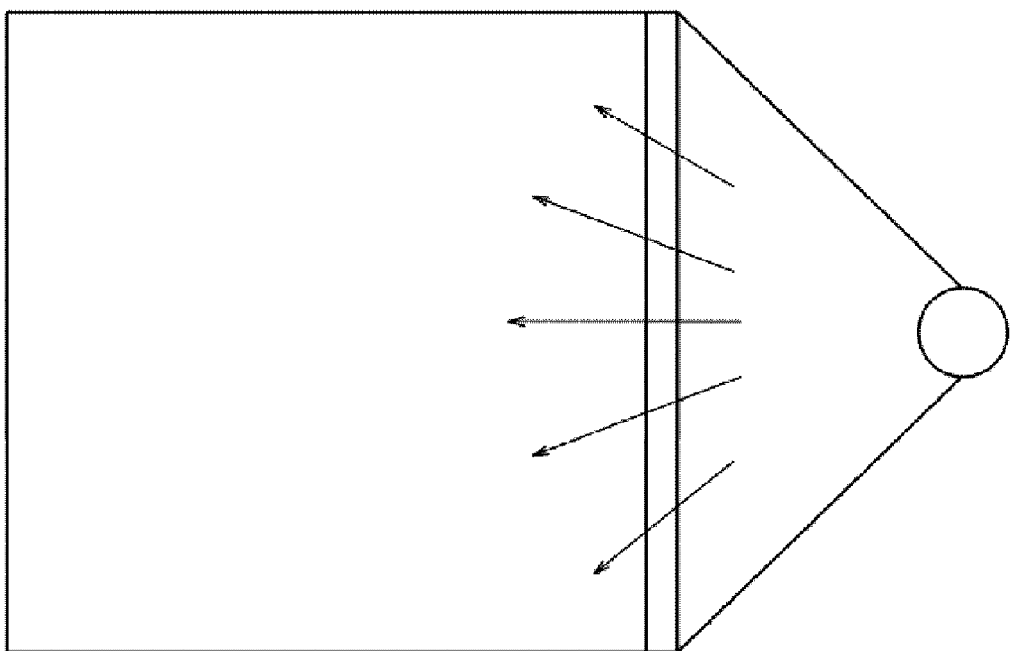
FIG. 5 is a view illustrating the resin flow in the conventional mold.

FIG. 4 illustrates the structure similar to the merging area 16, but a flow from the central portion to the right and left is generated. In addition, in FIG. 5, a radial flow is generated from the sprue section 11. Accordingly, both of them generate a flow that expands in the width direction in the cavity 15, and the orientation direction of the filler is not aligned in the molded article.

In this embodiment, the runner section 12 has a substantially quadrilateral shape, and the sprue section 11 is connected to a central portion of a side thereof (an upper side in FIG. 2) that opposes one side (a lower side in FIG. 2) provided with the slit gate section 13. Here, the runner section 12 is not limited to the quadrilateral shape and may have a triangular shape, for example. At this time, the slit gate section 13 may be provided to a bottom side portion of a triangle, and the sprue section 11 may be connected to an apex portion. Here, in order to offset the TD component of the molten material in the central portion of the slit gate section 13, the sprue section 11 is preferably located on a perpendicular bisector of the slit gate section 13 in a cross-sectional view as illustrated in FIG. 2. However, the position of the sprue section 11 that is connected to the runner section 12 is not limited thereto. In this embodiment, the slit gate section 13 is thinner than the runner section 12 except for the slit gate section 13, but may be in another form.

Furthermore, the runner section 12 may be provided with a gas vent at a position opposing the slit gate section 13 with the merging area 16 being interposed therebetween. By providing the gas vent, it is possible to suppress thermal degradation of the material due to adiabatic compression, which is caused by gas produced from the air and the material in the mold 1.

Here, the slit gate section 13 is configured as a film gate in this embodiment. The film gate has a thinner portion than the cavity 15 but may be in another form. However, a gate thickness has to be thinner than a runner thickness. If the gate is extremely thick, the molten material flows into the cavity 15 before filling the merging area 16, which degrades an effect of aligning the orientation.

The molding section 14 has the cavity 15 that is filled with the molten material to mold the plate-shaped molded article 20. A size of the cavity 15 (that is, a size of the plate-shaped molded article 20) may be 100 mm in each of TD and MD, for example. The cavity 15 is not limited to this size, may have a rectangular shape.

(Method for Producing Plate-Shaped Molded Article)

By using the mold 1 described above, the plate-shaped molded article 20 can be produced by injection molding. A method for producing the plate-shaped molded article 20 includes a step of using the mold 1 to fill the cavity 15 with the merged molten material via the slit gate section 13. The method for producing the plate-shaped molded article 20 can also include a known step executed in injection molding. As described above, in the central portion in the width direction of the plate-shaped molded article 20, which is produced by the producing method according to this embodiment, the orientation direction of the filler particularly follows the flow direction. In this embodiment, the plate-shaped molded article 20 is a material for a test piece 30 but is not limited to such application. The plate-shaped molded article 20 may be a plate-shaped product such as a building material or a packaging material.

In the central portion in the width direction of the plate-shaped molded article 20, an orientation tensor of the filler at a center of the thickness in the MD direction (the flow direction) is preferably 0.60 or greater and is preferably 0.95 or less. The orientation tensor can be obtained by photographing a center portion in a thickness direction (the center of the thickness) of a sample, which is cut from the central portion of the plate-shaped molded article, by using a three-dimensional measurement X-ray CT scanner and measuring an angle defined by the MD direction and the filler from an image analysis on this photographed image as in examples.

(Method for Producing Test Piece)

Figure 3:
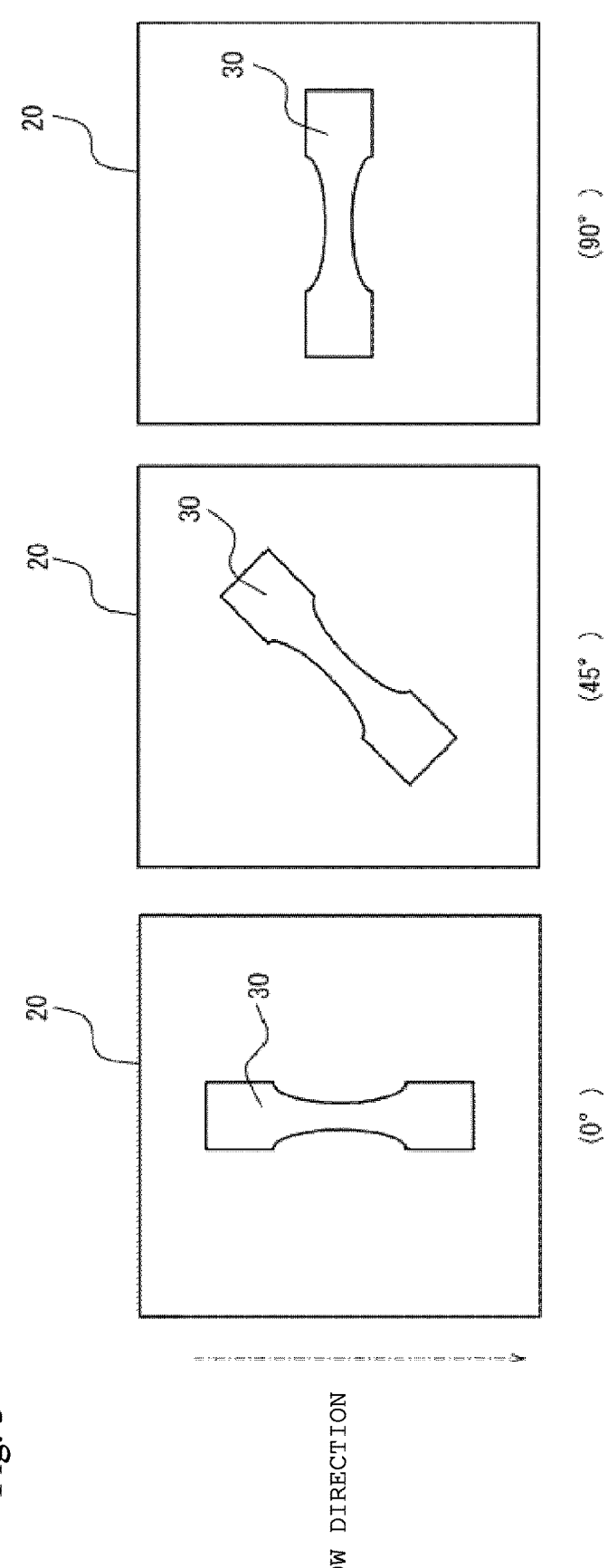
FIG. 3 is a view for explaining cutout of a test piece.

The test piece 30 can be produced by cutting out the test piece 30 from the plate-shaped molded article 20 described above. A method for producing the test piece 30 includes a step of cutting out the test piece 30 from the plate-shaped molded article 20 along at least one angle in a range of 0° to 90° with respect to the flow direction. FIG. 3 is a view for explaining cutout of the test piece 30. As described above, in the central portion in the width direction of the plate-shaped molded article 20, particularly, the orientation direction of the filler follows the flow direction. As illustrated in FIG. 3, the test piece 30 is cut out in a manner to include the center portion of the plate-shaped molded article 20. The test piece 30 has a dumbbell shape, for example, but is not limited to this shape. As illustrated in FIG. 3, in this embodiment, an angle of the test piece 30 with respect to the flow direction is an angle that is defined by the flow direction and a longitudinal direction of the test piece 30. In an order from left to right in FIG. 3, the test piece 30 is cut out along an angle of each of 0°, 45°, and 90° with respect to the flow direction.

The cut test piece 30 has a central portion in which the orientation direction of the filler is particularly aligned. A characteristic such as strength is measured in the central portion of the test piece. For this reason, this characteristic is particularly useful. By evaluating such a test piece 30 and applying measured characteristic data of the test piece 30 to a Computer Aided Engineering (CAE) analysis of an injection molded article, a product characteristic can be predicted with higher accuracy than ever before.

(Method for Predicting Characteristics of Resin Composition Molded Article)

By using the measured characteristic of the test piece 30 described above, a characteristic of a resin composition molded article can be predicted. Here, the characteristic may be a mechanical characteristic such as strength or a modulus of elasticity, but is not limited thereto, and may be a material characteristic or a physical property such as electrical conductivity or thermal conductivity. In addition, in the present disclosure, prediction means calculation rather than actual measurement at least in part. A method for predicting the characteristics of the resin composition molded article includes: a step of measuring the characteristic of the test piece 30 described above; and a step of calculating the different characteristic of the resin composition molded article from the test piece 30 on the basis of the measured characteristic of the test piece 30. The method for predicting the characteristics of the resin composition molded article can also include a known step executed in characteristic prediction.

The method for predicting the characteristics of the resin composition molded article is divided into: product characteristic prediction processing for predicting the characteristic of the product as the resin composition molded article; and reference data acquisition processing for obtaining reference data used in the product characteristic prediction processing. The reference data acquisition processing is executed before the product characteristic prediction processing. The step of measuring the characteristic of the test piece 30 is executed as one step of the reference data acquisition processing. The step of calculating the characteristic of the resin composition molded article is executed as one step of the product characteristic prediction processing.

(Reference Data Acquisition Processing)

The reference data includes data on any angle between 0° and 90°. In order to improve accuracy in the product characteristic prediction processing, the reference data preferably includes data on the characteristic of the test piece 30 at an angle, such as 45°, therebetween. As the step of measuring the characteristic of the test piece 30, the characteristic is measured. A measurement result is imported as the reference data into computer simulation for the CAE analysis.

In this embodiment, the computer simulation can analyze, for example, deformation due to shrinkage or warpage of the molded article, residual stress in the molded article, and orientation of the fibrous filler in addition to the characteristic (the strength as the example) of the molded article. As described above, the test piece 30 is cut out from the plate-shaped molded article 20 in which the orientation direction of the filler is along the flow direction in comparison with the related art. Thus, by using the data on the characteristic of the test piece 30 as the reference data, the analysis result by the computer simulation, that is, the predicted product characteristic is more accurate than the related art.

In the computer simulation described above, the characteristic at an angle not in the reference data may be calculated by a known complementary technique. In addition, a predictive model may be used in the computer simulation, and the data on the characteristic of the test piece 30 at least at the angle required by an implementer may be used in generating the predictive model. The angles required by the implementer may include 0° and 90°, for example. The predictive model may be generated by machine learning using the data on the characteristic of the test piece 30 as learning data.

(Product Characteristic Prediction Processing)

After the reference data acquisition processing, the computer simulation obtains structural information on the product, which is the resin composition molded article. The structural information on the product may be obtained, for example, by reading a three-dimensional model in a Computer-Aided Design (CAD) application. Then, mesh division by a finite element method, for example, may be executed to create a finite element model. Furthermore, a flow analysis and an orientation analysis of the molten material during injection molding of the product may be made. After such analyses, the characteristic is calculated by using the reference data in response to the product orientation. In other words, the step of calculating the characteristic of the resin composition molded article is executed.

In the product characteristic prediction processing, the strength of each part of the product may be calculated from the calculated product characteristic, so as to predict how much load is withstood in which direction, or the like. A calculated characteristic value and the prediction result based on the characteristic may be displayed for the implementer of the computer simulation.

In addition to the computer simulation, in the product characteristic prediction processing, materials informatics (MI) may also be used to analyze the data by machine learning or artificial intelligence (AI), for example. In such a case, the reference data that is obtained by the above method can be used as the learning data (teacher data).

(Resin Composition)

The plate-shaped molded article 20 described above is formed from the resin composition containing the thermoplastic resin and the filler. In this embodiment, the thermoplastic resin is not particularly limited, and examples thereof are: polyolefin resins such as polyethylene, polypropylene, poly(4-methyl-1-pentene), and poly(l-butene); polyester resins such as polyethylene terephthalate, polybutylene terephthalate, and polyethylene naphthalate; polyamide resins such as polyamide-6 (nylon-6), polyamide-66 (nylon-66), and polymethaxylene adipamide; ethylene-unsaturated ester copolymers such as an ethylene-vinyl ester copolymer and an ethylene-unsaturated carboxylic ester copolymer; an ethylene-unsaturated carboxylic acid copolymer or an ionomer resin thereof; a poly(meth)acrylic resin such as a poly(meth) acrylic ester resin; chlorine resins such as polyvinyl chloride and polyvinylidene chloride; fluorinated resins such as polytetrafluoroethylene, an ethylene tetrafluoroethylene copolymer, polyvinylidene fluoride, and polyvinylidene fluoride; a polystyrene resin; polyether resins such as a polyether ether ketone resin and a polyether ketone resin; a polycarbonate resin; polyphenylene resins such as a polyarylene sulfide resin represented by a polyphenylene sulfide resin and a polyphenylene oxide resin; a polyvinyl acetate resin; a polyacrylonitrile resin; a thermoplastic elastomer; and a liquid crystal polymer (LCP). One type selected from these thermoplastic resins may be used alone, or two types or more may be used in combination.

In this embodiment, the filler is not particularly limited as long as the filler has a shape that can be oriented when the thermoplastic resin is softened and flows in the mold. Examples thereof are organic and inorganic fillers with aspect ratios, such as a fibrous filler, a needle-like filler, and a non-fibrous filler that is granular or plate-like. Among these, the fibrous filler is preferred. More specifically, any of the fibrous fillers, which contain glass fiber, carbon fiber, aramid fiber, fiber such as potassium titanate, calcium silicate, and wollastonite, natural fiber, and milled fiber, and non-fibrous fillers, which contain barium sulfate, clay, pyrophyllite, bentonite, sericite, mica, talc, attapulgite, ferrite, calcium silicate, calcium carbonate, magnesium carbonate, zeolite, and calcium sulfate, with the aspect ratios ranging from about 2 to 100 is used. Here, the aspect ratio (a ratio between the longest length (a long axis) and the shortest length (a short axis) at the time of generating a two-dimensional image) is not particularly limited, but is preferably 2 or greater, more preferably 2 or greater, and is preferably 100 or less, more preferably 50 or less although an upper limit value is not set. A compound ratio of the filler is preferably within a range of 0.01 part by mass or greater, more preferably 0.1 part by mass or greater, to 100 parts by mass of the thermoplastic resin. In addition, although not limited, the upper limit value is preferably 250 parts by mass or less, more preferably 600 parts by mass or less.

While the resin composition contains the thermoplastic resin and the filler as essential components, the resin composition may also contain, as an optional component, a known and customary additive, such as a colorant, an antistatic agent, an antioxidant, a heat stabilizer, a UV stabilizer, a UV absorber, a foaming agent, a flame retardant, a flame-retardant promoter, a rust inhibitor, or a coupling agent when necessary. These additives are not the essential components, and any thereof may be used, for example, preferably within a range of 0.01 part by mass or greater and preferably within a range of 100 parts by mass or less to 100 parts by mass of the thermoplastic resin while being appropriately adjusted according to a purpose and application so as not to impair the effects of the present disclosure.

A method for producing the resin composition includes a step of combining the thermoplastic resin and the filler as the essential components and melting and kneading the thermoplastic resin and the filler within a temperature range of a temperature, at which the thermoplastic resin is softened and flows by heating (may be a melting point in a case of a crystalline resin or a glass transition point in a case of a non-crystalline resin, hereinafter simply referred to as a "softening and fluidizing temperature"), or higher.

The resin composition contains each of the essential components and another optional component when necessary. Although a method for producing the resin composition is not particularly limited, an example thereof is a method for combining, melting, and kneading the essential components and the optional component when necessary, in detail, a method for uniformly drying and mixing with a tumbler, a Henschel mixer, or the like when necessary, followed by feeding into a twin-screw extruder for melting and kneading.

Melting and kneading can be performed by heating the resin to a temperature range where the resin temperature becomes the softening and fluidizing temperature of the thermoplastic resin or higher, preferably a temperature range of the softening and fluidizing temperature+10° C. or higher, more preferably, to a range from the softening and fluidizing temperature+20° C. or higher to preferably the softening and fluidizing temperature+100° C. or lower, more preferably, the softening and fluidizing temperature+50° C. or lower. For example, the temperature range can be determined according to ease of softening and flowing of the thermoplastic resin as a matrix resin within a range of preferably 100° C. or higher, more preferably 120° C. or higher, or even more preferably 150° C. or higher to a range of preferably 400° C. or lower, more preferably 380° C. or lower, or even more preferably 350° C. or lower.

The resin composition is preferably pre-dried, after the melting and kneading, when necessary by a known method, for example, by extruding the molten resin composition into strands and thereafter processing the strands of the resin composition into the form of pellets, chips, granules, powder, or the like.

The thus-obtained resin composition is used in the production of the plate-shaped molded article and the test piece described above. For example, the resin composition becomes the molten material through a process of softening and fluidizing the resin composition in an injection molding machine by heating at a temperature that is determined according to the ease of softening and flowing of the thermoplastic resin as the matrix resin from a temperature range where the resin temperature is the temperature at which the thermoplastic resin flows or higher, preferably a temperature range of the softening and fluidizing temperature+10° C. or higher, more preferably a temperature range of the softening and fluidizing temperature+20° C. or higher, to a temperature range of the softening and fluidizing temperature+100° C. or lower, more preferably a temperature range of the softening and fluidizing temperature+50° C. or lower, for example, from a temperature range of preferably 100° C. or higher, more preferably 120° C. or higher, or even more preferably 150° C. or higher to a temperature range of preferably 400° C. or lower, more preferably 380° C. or lower, or even more preferably 350° C. or lower. The molten material is injected into the mold 1 described above.

The above description has been made that the plate-shaped molded article 20 and the test piece 30 are produced by using the molten material of the resin composition.

In this embodiment, the result that is obtained by the characteristic prediction method can further be utilized (used) in commercialization (so-called mass production) of the molded article. For example, at least some of the materials and the production processes can be designed such that the product (the shape) has the desired characteristic by using the computer simulation capable of executing the characteristic prediction method. The design of the material may be, but not limited to, controlling composition of each material in the resin composition, such as increasing the filler to compensate for a lack of the strength. The design of the production process may be, but not limited to, designing the mold that is used to produce the molded article by melting and molding the resin composition. In particular, designing of the mold can be a change in a mold shape or a change in a product shape, the mold shape being changed to control the favorable fiber orientation against the load by changing a location of a resin inlet (the gate) to a product portion, and the product shape being changed to improve the strength by thickening the product.

Such utilization (use) can significantly reduce the number of prototypes to be made on an actual machine during the commercialization and thus can further improve productivity.

Here, in general, the resin composition molded article is not particularly limited and can be a general injection molded article. Examples thereof are piping for transporting a fluid and various parts attached to the piping such as a pipe, a lining pipe, bag nuts, pipe fittings, (an elbow, a header, a cheese, a reducer, a joint, a coupler, and the like), various valves, a flow meter, and gaskets (a seal, a packing, and the like). Thus, examples are parts such as automobile parts associated with an internal combustion engine such as various fuel-related, exhaust, and intake pipes, an air intake nozzle snorkel, an intake manifold, a fuel pump, an engine coolant joint, and a water inlet/outlet, and the resin composition molded article can also be applied to any of various other applications.

EXAMPLES

A description will hereinafter be made on examples and comparative examples. However, the present disclosure is not limited to these examples.

(Raw Materials)

Raw materials used in the examples and the comparative examples are as follows.

<<PAS Resin Composition>>

"Z-650-SW" manufactured by DIC Corporation (PPS resin containing 50 wt % of the elastomer and the glass fiber and the filler as the fiber fillers)

<<PA Resin Composition>>

"ULTRAMID A3HG5" manufactured by BASF Japan Ltd. (PA resin containing 25 wt % of the glass fiber)

<<PE Resin Composition>>

A PE resin composition produced by combining 10 wt of the glass fiber with "Novatec HD HJ560W" manufactured by Japan Polyethylene Corporation (Evaluation)

The dumbbell-shaped test piece was produced from the flat plate that is molded by using the mold according to the present disclosure, and the characteristic of the test piece was measured or calculated. Injection molding was performed on the SE-75DU injection molding machine manufactured by Sumitomo Heavy Industries, Ltd. As the characteristics, the following mechanical characteristics were measured. The dumbbell shape is used from ISO 1BA specimen geometries.

Orientation parameter: a core section of the dumbbell-shaped test piece was photographed using the X-ray CT scanner ("TDM1000H-II (2K)" manufactured by Yamato Scientific Co., Ltd.) (with a 3 mm×3 mm imaging area) to obtain a three-dimensional image of the inside of the test piece. The image was analyzed by image analysis software ("VGStudio MAX" manufactured by Volume Graphics GmbH). After separating a filler phase and a resin phase in the image by binarization, the orientation tensor was calculated by measuring the angle of the filler to the flow direction. Noted that, the orientation is completely aligned in the flow direction when the orientation tensor is 1.

Orientation tensor: the orientation tensor of a thickness average in the flow direction of the core section at the center of the test piece is an index indicating that a fiber angle is aligned in a cut direction, and is calculated by the computer simulation of a resin flow analysis (CAE). 1 indicates the completely aligned orientation. In this evaluation, the orientation tensor of the thickness average was calculated by using Moldflow Insight 2019 manufactured by AUTODESK Inc.

Young's modulus, tensile strength, tensile strain ISO 527-1, 2 (for Type 1BA test piece: a tensile speed of 2 mm/min, for Type A test piece: a tensile speed of 5 mm/min)

Comparison with Polyphenylene Sulfide (PPS) Resin

Examples 1 to 2

In Example 1 and Example 2, the plate-shaped molded article was injection molded by using the mold according to the present disclosure (the mold including the runner section that divided and then merged the molten material), and the dumbbell-shaped test piece was cut from the plate-shaped molded article. The cutout angle (the angle in the longitudinal direction of the cut test piece to the flow direction) in Example 1 is 0°. The cutout angle in Example 2 is 90°.

Comparative Examples 1 to 2

In Comparative Example 1 and Comparative Example 2, the plate-shaped molded article was injection molded by using the mold according to the related art (the mold including the runner section that guided the molten material to the slit gate section without dividing the molten material), and the dumbbell-shaped test piece was cut from the plate-shaped molded article. The cutout angle in Comparative Example 1 is 0°. The cutout angle in Comparative Example 2 is 90°.

Comparative Example 3

In Comparative Example 3, the test piece was injection molded by using a mold for molding a dumbbell test piece. The dumbbell test piece is the molded article in a shape that is long in one direction, and is generally recognized that, particularly in a narrow central portion thereof, the glass fiber is substantially completely and highly oriented in the longitudinal direction. The fiber orientation is 0°.

Comparative Example 4

To clarify that no weld occurred in Example 2, the following experiment was performed as a contrast test. In other words, in Comparative Example 4, the test piece was injection molded by using the mold for molding the dumbbell test piece such that the weld occurred in the central portion by causing the molten material to flow from both ends of the dumbbell.

Manufacturing conditions and evaluation results of the characteristics in Examples 1 to 2 and Comparative Examples 1 to 4 are illustrated in Table 1 below.

TABLE 1

| | Example 1 | Example 2 | Comparative Example 1 | Comparative Example 2 | Comparative Example 3 | Comparative Example 4 |
|---|---|---|---|---|---|---|
| Mold shape | Flat (new) | Flat (new) | Flat (conventional) | Flat (conventional) | Type A dumbbell | Type A dumbbell |
| Material | PPS | PPS | PPS | PPS | PPS | PPS |
| Cutout direction/fiber orientation | 0° | 90° | 0° | 90° | 0° | Weld |
| Orientation tensor at center of thickness in flow direction of center of test piece (CAE) | 0.89 | 0.04 | 0.13 | 0.82 | — | — |
| Orientation parameter at center of thickness in flow direction at center of test piece (X-ray CT) | — | — | — | — | — | — |
| Young's modulus [Gpa] | 15 | 7 | 10 | 7 | 14 | 11 |
| Tensile strength [MPa] | 157 | 59 | 108 | 65 | 162 | 42 |
| Tensile strain [%] (Strain at maximum stress point) | 1.6 | 1.3 | 2.7 | 1.7 | 1.7 | 0.5 |
| Ratio to 0° (Young's modulus) | — | 0.5 | — | 0.7 | — | — |
| Ratio to 0° (Tensile strength) | — | 0.4 | — | 0.6 | — | — |

Comparison with Polyamide (PA) Resin

Examples 3 to 4

In Example 3 and Example 4, the dumbbell-shaped test piece was cut from the plate-shaped molded article that was injection molded by using the mold according to the present disclosure. The cutout angle in Example 1 is 0°. The cutout angle in Example 2 is 90°.

Comparative Examples 5 to 6

In Comparative Example 5 and Comparative Example 6, the dumbbell-shaped test piece was cut from the plate-shaped molded article by using the mold in the related art. The cutout angle in Comparative Example 5 is 0°. The cutout angle in Comparative Example 6 is 90°.

Comparative Example 7

In Comparative Example 7, the test piece was injection molded by using the mold for molding the dumbbell test piece. The fiber orientation is 0°.

Comparative Example 8

In Comparative Example 8, the test piece was injection molded by using the mold for molding the dumbbell test piece such that the weld occurred in the central portion by causing the molten material to flow from both of the ends of the dumbbell.

Manufacturing conditions and evaluation results of the characteristics in Examples 3 to 4 and Comparative Examples 5 to 8 are illustrated in Table 2 below.

Comparison with Polyethylene (PE) Resin

Examples 5 to 6

In Example 5 and Example 6, the dumbbell-shaped test piece was cut from the plate-shaped molded article that was injection molded by using the mold according to the present disclosure. The cutout angle in Example 1 is 0°. The cutout angle in Example 2 is 90°.

Comparative Examples 9 to 10

In Comparative Example 9 and Comparative Example 10, the dumbbell-shaped test piece was cut from the plate-shaped molded article by using the mold in the related art. The cutout angle in Comparative Example 9 is 0°. The cutout angle in Comparative Example 10 is 90°.

Comparative Example 11

In Comparative Example 11, the test piece was injection molded by using the mold for molding the dumbbell test piece. The fiber orientation is 0°.

Comparative Example 12

In Comparative Example 12, the test piece was injection molded by using the mold for molding the dumbbell test piece such that the weld occurred in the central portion by causing the molten material to flow from both of the ends of the dumbbell.

Manufacturing conditions and evaluation results of the characteristics in Examples 5 to 6 and Comparative Examples 9 to 12 are illustrated in Table 3 below.

TABLE 2

| | Example 3 | Example 4 | Comparative Example 5 | Comparative Example 6 | Comparative Example 7 | Comparative Example 8 |
|---|---|---|---|---|---|---|
| Mold shape | Flat (new) | Flat (new) | Flat (conventional) | Flat (conventional) | Type A dumbbell | Type A dumbbell |
| Material | PA | PA | PA | PA | PA | PA |
| Cutout direction/fiber orientation | 0° | 90° | 0° | 90° | 0° | Weld |
| Orientation tensor at center of thickness in flow direction of center of test piece (CAE) | 0.86 | 0.04 | 0.22 | 0.73 | — | — |
| Orientation parameter at center of thickness in flow direction at center of test piece (X-ray CT) | 0.65 | 0.17 | 0.25 | 0.54 | — | — |
| Young's modulus [Gpa] | 8 | 4 | 6 | 4 | 8 | 7 |
| Tensile strength [MPa] | 141 | 73 | 115 | 79 | 170 | 76 |
| Tensile strain [%] (Strain at maximum stress point) | 3.6 | 5.3 | 4.1 | 3.6 | 3.2 | 1.2 |
| Ratio to 0° (Young's modulus) | — | 0.5 | — | 0.8 | — | — |
| Ratio to 0° (Tensile strength) | — | 0.5 | — | 0.7 | — | — |

TABLE 3

| | Example 5 | Example 6 | Comparative Example 9 | Comparative Example 10 | Comparative Example 11 | Comparative Example 12 |
|---|---|---|---|---|---|---|
| Mold shape | Flat (new) | Flat (new) | Flat (conventional) | Flat (conventional) | Type 1BA dumbbell | Type 1BA dumbbell |
| Material | PE | PE | PE | PE | PE | PE |
| Cutout direction/fiber orientation | 0° | 90° | 0° | 90° | 0° | Weld |
| Orientation tensor at center of thickness in flow direction of center of test piece (CAE) | 0.94 | 0.03 | 0.11 | 0.87 | — | — |
| Orientation parameter at center of thickness in flow direction at center of test piece (X-ray CT) | 0.93 | 0.04 | 0.39 | 0.47 | — | — |
| Young's modulus [Gpa] | 3 | 2 | 1 | 1 | 3 | 2 |
| Tensile strength [MPa] | 25 | 21 | 21 | 24 | 26 | 21 |
| Tensile strain [%] (Strain at maximum stress point) | 8.5 | 7.2 | 10 | 7 | 8.6 | 5.6 |
| Ratio to 0° (Young's modulus) | — | 0.6 | — | 0.9 | — | — |
| Ratio to 0° (Tensile strength) | — | 0.8 | — | 1.1 | — | — |

(Measurement) Orientation Photograph of Cross Section

Figure 6:
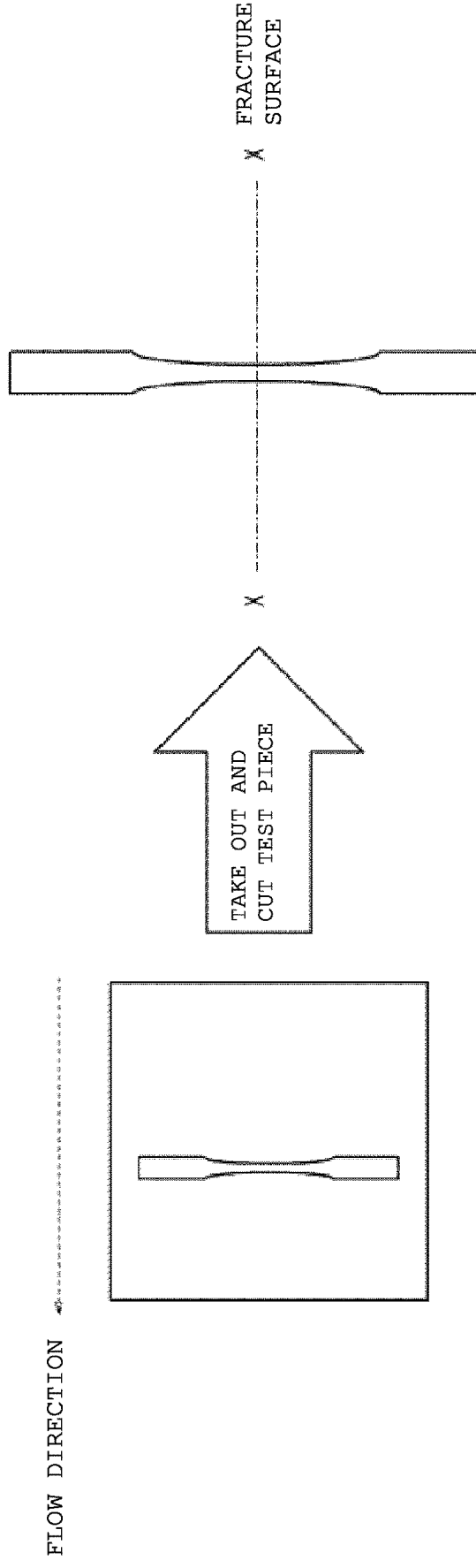
FIG. 6 is a schematic view for explaining a fracture surface of the test piece.

Fracture surfaces of the test pieces obtained in Example 4 and Comparative Example 6 were photographed by using "digital microscope VHX-2000" manufactured by KEYENCE CORPORATION. Each of the fracture surface is an X-X cross section that is obtained by cutting the central portion of the test piece in a thickness direction of the test piece along the flow direction (see FIG. 6).

Figure 7:
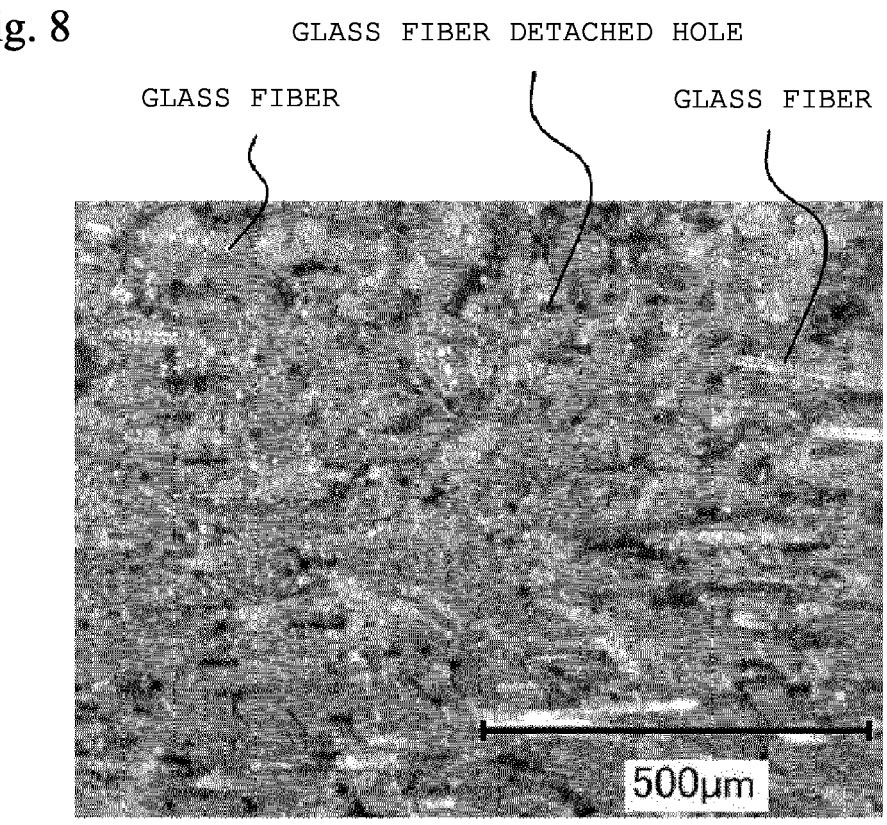
FIG. 7 is a micrograph of the fracture surface of the test piece obtained in Example 4.

The results are shown in FIG. 7 and FIG. 8. The glass fiber (an average fiber length of about 200 microns and a fiber diameter of about 10 microns) in the test piece was observed with the microscope. In both of Example 4 and Comparative Example 6, when a flow direction of the PPS resin matches the orientation direction of the glass fiber, the glass fiber is observed as a long rod (white). Meanwhile, when the flow direction differs from the orientation direction of the glass fiber, the glass fiber is observed as a circle (a white dot) or a hole (a black dot) where the glass fiber is detached due to a fracture of the test piece.

As a result of the contrast, in Example 4, a large number of the glass fiber was observed as the long rods, and there were very few circular black dots. On the contrary, in Comparative Example 6 using the mold in the related art, while the small number of the glass fiber was observed as the long rods, a large number of the circular black dots were observed.

In other words, it was found in Example 4 that the filler was more aligned in the flow direction of the PPS resin than in Comparative Example 6.

As it is understood from the contrast between Example 1 and Comparative Example 1, the contrast between Example 3 and Comparative Example 5, and the contrast between Example 5 and Comparative Example 9, the test piece that is produced by using the mold according to this embodiment has greater Young's modulus, the greater tensile strength, and the less tensile strain in the 0° direction than the test piece that is produced in the related art.

In addition, as it is understood from the contrast between Example 3 and Comparative Example 5 and the contrast between Example 5 and Comparative Example 9, the test piece that is produced by using the mold according to this embodiment has the greater orientation tensor and the greater orientation parameter in the 0° direction than the test piece produced in the related art. Thus, it is found that the filler is further aligned in the flow direction of the resin.

Meanwhile, in the contrast between Example 2 and Comparative Example 2, the contrast between Example 4 and Comparative Example 6, and the contrast between Example 6 and Comparative Example 10, the test piece that is produced by using the mold according to this embodiment has the less tensile strength in the 90° direction than the test piece that is produced in the related art.

In terms of each of the tensile strength and the tensile strain, since the orientation direction of the filler is more aligned in Examples 1 and 2 than in Comparative Examples 1 and 2, a magnitude thereof appears significantly as indicated by the ratio to 0°. Similarly, in Examples 3 and 4, the magnitude appears more significantly than in Comparative Examples 5 and 6. In addition, similarly, in Examples 5 and 6, the magnitude appears more significantly than in Comparative Examples 9 and 10.

Here, it is understood from the contrast between Example 2 and Comparative Example 4 that the values of the tensile strain significantly differ from each other and that the weld does not occur in Example 2 that shows no significant reduction in the value of the tensile strain characteristic of the weld.

As it is apparent from the above contrasts, it is possible to produce the test piece in which the orientation direction of the filler is aligned with a high degree of accuracy by the mold, the method for producing the plate-shaped molded article, and the method for producing the test piece according to this embodiment. In addition, the data on the relationship between the orientation angle and each of the various characteristics can be measured for the first time by using the test piece in which the orientation direction of the filler is aligned with the high degree of accuracy. The thus-obtained data can be entered as basic data for the prediction of the molded article by the CAE. By using such a test piece, it is possible to predict the characteristic of the resin composition molded article with a high degree of accuracy.

REFERENCE SIGNS LIST

1: Mold
11: Sprue section
12: Runner section
13: Slit gate section
14: Molding section
15: Cavity
16: Merging area
20: Plate-shaped molded article
30: Test piece

The invention claimed is:

1. A mold for injection molding a plate-shaped molded article by using a molten material of a thermoplastic resin, the mold comprising:

a runner section that has a slit gate section provided along a width direction of the plate-shaped molded article and is configured to fill a cavity with the molten material via the slit gate section, the molten material being injected via a sprue section, wherein the runner section divides the molten material from the sprue section, merges the divided molten materials in a portion along the slit gate section, and guides the merged molten material to the slit gate section, wherein in a merging area along the slit gate section, the divided molten materials are merged from both sides in a perpendicular direction to a flow direction in the cavity towards a center, wherein the runner section includes a first runner leg and a second runner leg, wherein the runner section divides the molten material from the sprue section into the first runner leg and the second runner leg, and wherein the merging area includes a first end and a second end positioned opposite the first end across the width direction of the plate shape molded article, wherein the merging area extends perpendicular to downstream portions of the first runner leg and the second runner leg, wherein the downstream portion of the first runner leg merges with the merging area at the first end of the merging area and the downstream portion of the second runner leg merges with the merging area at the second end of the merging area, wherein the slit gate section is positioned relative to the merging area so as to guide the molten material toward a center of the slit gate section.

2. The mold according to claim 1, wherein the slit gate section is thinner than the runner section.

3. A method for producing a plate-shaped molded article comprising:

a step of using the mold according to claim 1 to fill the cavity with the merged molten material via the slit gate section.

4. The method for producing a plate-shaped molded article according to claim 3, wherein an orientation tensor in the flow direction at a center of a thickness of the obtained plate-shaped molded article is in a range of 0.60 to 0.95.

5. A method for producing a test piece comprising:

a step of cutting out a test piece from a plate-shaped molded article, which is produced by the method for producing a plate-shaped molded article according to claim 3, along at least one angle within a range of 0° to 90° with respect to the flow direction.

6. The method for producing a test piece according to claim 5, wherein an orientation tensor in the flow direction at a center of a thickness of the obtained test piece is in a range of 0.60 to 0.95.

7. A method for predicting a characteristic of a resin composition molded article comprising:

a step of measuring a characteristic of a test piece that is produced by the method for producing a test piece according to claim 5; and a step of calculating a characteristic of a resin composition molded article that differs from the test piece on the basis of the measured characteristic of the test piece.

8. A method for producing a plate-shaped molded article comprising:

a step of using the mold according to claim 2 to fill the cavity with the merged molten material via the slit gate section.

9. The method for producing a plate-shaped molded article according to claim 8, wherein an orientation tensor in the flow direction at a center of a thickness of the obtained plate-shaped molded article is in a range of 0.60 to 0.95.

10. A method for producing a test piece comprising:

a step of cutting out a test piece from a plate-shaped molded article, which is produced by the method for producing a plate-shaped molded article according to claim 8, along at least one angle within a range of 0° to 90° with respect to the flow direction.

11. The method for producing a test piece according to claim 10, wherein an orientation tensor in the flow direction at a center of a thickness of the obtained test piece is in a range of 0.60 to 0.95.

12. A method for predicting a characteristic of a resin composition molded article comprising:

a step of measuring a characteristic of a test piece that is produced by the method for producing a test piece according to claim 10; and a step of calculating a characteristic of a resin composition molded article that differs from the test piece on the basis of the measured characteristic of the test piece.

13. A method for predicting a characteristic of a resin composition molded article comprising:

a step of measuring a characteristic of a test piece that is produced by the method for producing a test piece according to claim 11; and a step of calculating a characteristic of a resin composition molded article that differs from the test piece on the basis of the measured characteristic of the test piece.

* * * * *